US010505763B1

(12) United States Patent
Nelson et al.

(10) Patent No.: US 10,505,763 B1
(45) Date of Patent: Dec. 10, 2019

(54) METHOD, APPARATUS AND COMPUTER PROGRAM TO PROVIDE ACCESS TO CLIENT RECORDS AND DATA RESOURCES

(71) Applicant: West Corporation, Omaha, NE (US)

(72) Inventors: Cindy Rae Nelson, Spanish Fort, AL (US); Charles Stephen Fesler, Mobile, AL (US); Theodore Ellzey McGallagher, Mobile, AL (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 16/285,526

(22) Filed: Feb. 26, 2019

Related U.S. Application Data

(63) Continuation of application No. 15/695,489, filed on Sep. 5, 2017, now Pat. No. 10,218,537, which is a continuation of application No. 12/758,947, filed on Apr. 13, 2010, now Pat. No. 9,755,856.

(51) Int. Cl.
| | |
|---|---|
| *G06F 15/16* | (2006.01) |
| *H04L 12/52* | (2006.01) |
| *H04L 29/08* | (2006.01) |
| *G06F 16/242* | (2019.01) |
| *G06F 9/54* | (2006.01) |
| *G06F 16/185* | (2019.01) |

(52) U.S. Cl.
CPC ............ *H04L 12/52* (2013.01); *G06F 16/242* (2019.01); *H04L 67/06* (2013.01); *H04L 67/1002* (2013.01); *H04L 67/108* (2013.01); *H04L 67/1097* (2013.01); *G06F 9/546* (2013.01); *G06F 16/185* (2019.01); *H04L 67/1095* (2013.01)

(58) Field of Classification Search
CPC ..... H04L 12/52; H04L 67/06; H04L 67/1002; H04L 67/108; H04L 67/1097; H04L 67/1095; G06F 16/242; G06F 16/185; G06F 9/546
USPC ......................................................... 709/219
See application file for complete search history.

(56) References Cited

U.S. PATENT DOCUMENTS

| | | | | |
|---|---|---|---|---|
| 7,962,779 B2* | 6/2011 | Patel | ................... | G06F 11/1076 714/4.12 |
| 8,195,760 B2* | 6/2012 | Lacapra | .............. | G06F 11/1076 709/214 |
| 8,209,307 B2* | 6/2012 | Erofeev | ................ | G06F 3/0604 707/704 |
| 8,239,369 B2* | 8/2012 | Levin | .................... | G06F 16/217 707/713 |
| 8,285,681 B2* | 10/2012 | Prahlad | ................. | G06F 3/0649 707/640 |

(Continued)

*Primary Examiner* — Melvin H Pollack

(57) ABSTRACT

A method, computer program and apparatus are disclosed that include accessing client data records, such as, medical records. The method may include receiving a data file at a server sent from at least one client and including client requirements. The method may also include storing the received data file locally at the server, executing an application that scans the server to determine if any new data files have been received. The method may also include storing the copied data file in a data folder stored in a file cluster, updating a table stored in a database to indicate that a new file has been stored, deleting the locally stored file from the server, and moving files specified by the client requirements from an export folder of the file cluster to the server so that the at least one client may access the exported files.

20 Claims, 7 Drawing Sheets

(56) References Cited

U.S. PATENT DOCUMENTS

| | | | | |
|---|---|---|---|---|
| 9,378,212 B2* | 6/2016 | O'Brien | ............... | H04L 63/08 |
| 9,529,804 B1* | 12/2016 | Muddu | ............... | G06Q 10/00 |
| 2012/0310892 A1* | 12/2012 | Dam | ............... | G06F 11/2094 |
| | | | | 707/659 |

* cited by examiner

METHOD, APPARATUS AND COMPUTER PROGRAM TO PROVIDE ACCESS TO CLIENT RECORDS AND DATA RESOURCES

CROSS-REFERENCE TO RELATED APPLICATIONS

This application is a continuation from U.S. patent application Ser. No. 15/695,489, filed Sep. 5, 2017, entitled "METHOD, APPARATUS AND COMPUTER PROGRAM TO PROVIDE ACCESS TO CLIENT RECORDS AND DATA RESOURCES", which is a continuation from U.S. patent application Ser. No. 12/758,947, filed Apr. 13, 2010, entitled "METHOD, APPARATUS AND COMPUTER PROGRAM TO PROVIDE ACCESS TO CLIENT RECORDS AND DATA", now issued U.S. Pat. No. 9,755,856, the contents of each of which are incorporated by reference herein in their entirety.

FIELD OF THE INVENTION

The present inventive concept is related to a data records configuration that allows clients to access their personal data records and to receive updated information pertaining to their personal records information.

This application is a continuation from U.S. patent application Ser. No. 12/758,947, filed Apr. 13, 2010, entitled "METHOD, APPARATUS AND COMPUTER PROGRAM TO PROVIDE ACCESS TO CLIENT RECORDS AND DATA", the contents of which are incorporated by reference herein in their entirety.

BACKGROUND OF THE INVENTION

Conventional data record systems that provide client access to their personal records may be provided by a variety of different mediums and networking systems. One example of a data record system may be a telephony-based system which allows clients to access their personal record information by operating a telephone. For instance, a client may wish to access personal medical records stored in a remote database by calling a phone-based data record system and accessing their records via keypad entries or voice commands made over their telephones.

The telephony-based data record systems may provide access to client records through a remote web server and a corresponding database. For example, FIG. 1 illustrates a conventional data record accessing system 10A. Referring to FIG. 1, client 100 uses a hypertext transfer protocol script secure (HTTPS) web posting application to connect to a web server 101 over the network, which is illustrated by the network cloud that may represent a wide area network, the Internet, etc. Once a connection is established the client may send a data file to the web server 101.

The data file is originally sent to the web server 101 which provides a connection to a file server 102. After the file has been moved to the file server 102, a record is generated based on the received file, and that record is sent to a database server, such as, for example, a SQL server 103. The SQL server 103 receives the data file and a record may be generated and added to the SQL database in the SQL server 103.

The file server 102 includes two server engines, which include a parser server engine 102A and an image parser engine 102B. These file server engines provide additional features for processing the data files which are sent to the file server 102. For example, parser server 102A may read and write the data files to the SQL cluster at the SQL server 103. Other applications performed by the file server 102 may include file branding, storing and accessing of appointment file information and voice files (i.e., VCE files).

The SQL sever 103 may also provide additional applications, such as, a parse queue to parse data received from the data file, appointment data organization and storage, email applications for sending reminders to individuals including bulk email, news letter creation and updating procedures, after hours data access services for clients, and short messaging services (SMS) for clients.

The parser server 102A may also parse information for the client, such as, appointment data, and then format the appointment data for storage in appointment tables. The image parser may obtain image information stored in a remote storage unit 104, which may be a database of pre-stored data records, for example, dental records, medical records, x-rays, client chart information, etc.

After data has been stored and processed by the data record accessing system 10A, the clients may access the data records by using an internet portal link to connect to the web server 101 and access client data records. For example, a client may access pre-stored records to obtain appointment information of an approaching doctor appointment based on client data records previously stored in the appointment tables by the file server 102 and the parser server 102A.

Upon accessing the client's records, certain information may be provided automatically or in response to a request submitted by the client accessing the client's records. For instance, images that are stored in the storage 104 and that are associated with the client's personal data may be offered to the client and downloaded to the client's terminal device (not shown).

A similar access scheme may be performed by a client calling in over a telephone to a telephone server 106, which includes an engine 106A and a voice board 106B. For example, after the offices are closed, clients may desire to access their personal data records so that certain information may be confirmed, such as, their appointment time for their next doctor visit.

The engine 106A and the voice board 106B provide the clients with the necessary options to access their personal information. The client may access appointment information and pre-recorded voice file (VCE) information from the file server 102 regarding personal record information. In addition, the telephone server 106 may provide an emergency service that calls the clients when their related personal medical information requires immediate attention. The emergency notifications may also be provided by e-mail, text messaging and other notification techniques via the e-mail server 105.

The conventional data record accessing system 10A performs data record storage and accessing options without anticipating changes to the clients' needs and without providing a dynamic updating platform. Clients need access to all of their personal records, and also need to update their personal records based on the changes that may occur since their last information accessing session and/or during their current sessions with the data record assessing system.

SUMMARY OF THE INVENTION

Disclosed is an optimized method, computer program and apparatus to access data records that allows clients to access their personal data records and to receive updated information pertaining to their personal records information.

One example embodiment of the present inventive concept is a method of handling incoming data files at a data file handling network. The method includes receiving a data file at a server, the file being sent from at least one client and including client requirements. The method also includes storing the received data file locally at the server. The method further includes executing an application that scans the server to determine if any new data files have been received since a prior scanning operation. The method also includes copying the data file, storing the copied data file in a data folder stored in a file cluster, updating a table stored in a database to indicate that a new file has been stored, and deleting the locally stored file from the server. The method further includes moving files specified by the client requirements from an export folder of the file cluster to the server so that the at least one client may access the exported files.

Another example embodiment according to the present inventive concept includes a server configured to handle incoming data files. The server includes a receiver configured to receive a data file, the file is sent from at least one client and including client requirements. The apparatus also includes a memory configured to store the received data file locally at the server. The apparatus further includes a processor configured to execute an application that scans the server to determine if any new data files have been received since a prior scanning operation, copy the data file, store the copied data file in a data folder stored in a file cluster, and update a table stored in a database to indicate that a new file has been stored. The apparatus is further configured to delete the locally stored file from the server, and locate the files specified by the client requirements from an export folder of the file cluster so that the at least one client may access the exported files.

DETAILED DESCRIPTION OF THE PREFERRED EMBODIMENTS

Figure 1:
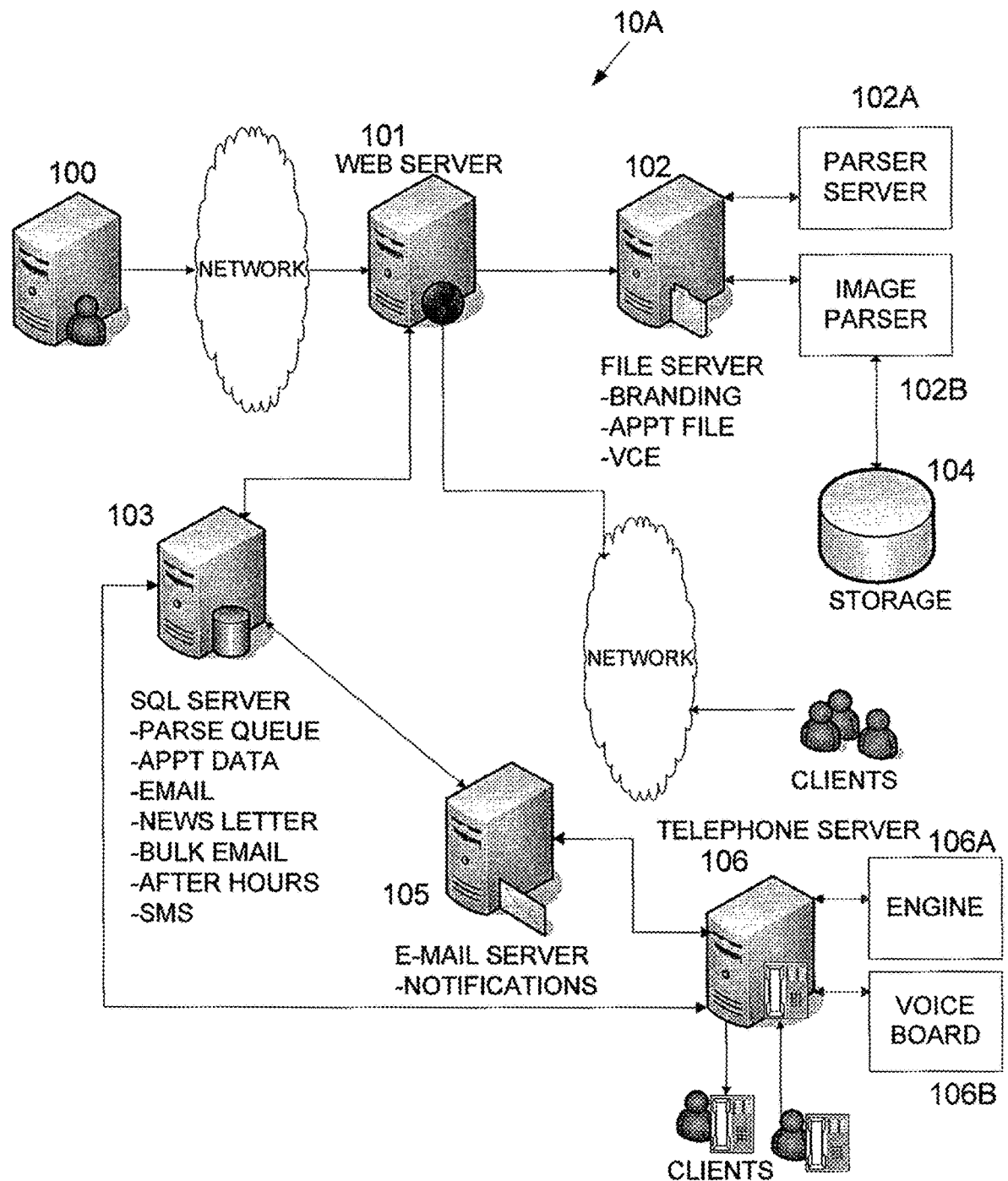
FIG. 1 illustrates a conventional data record accessing system.
Figure 2:
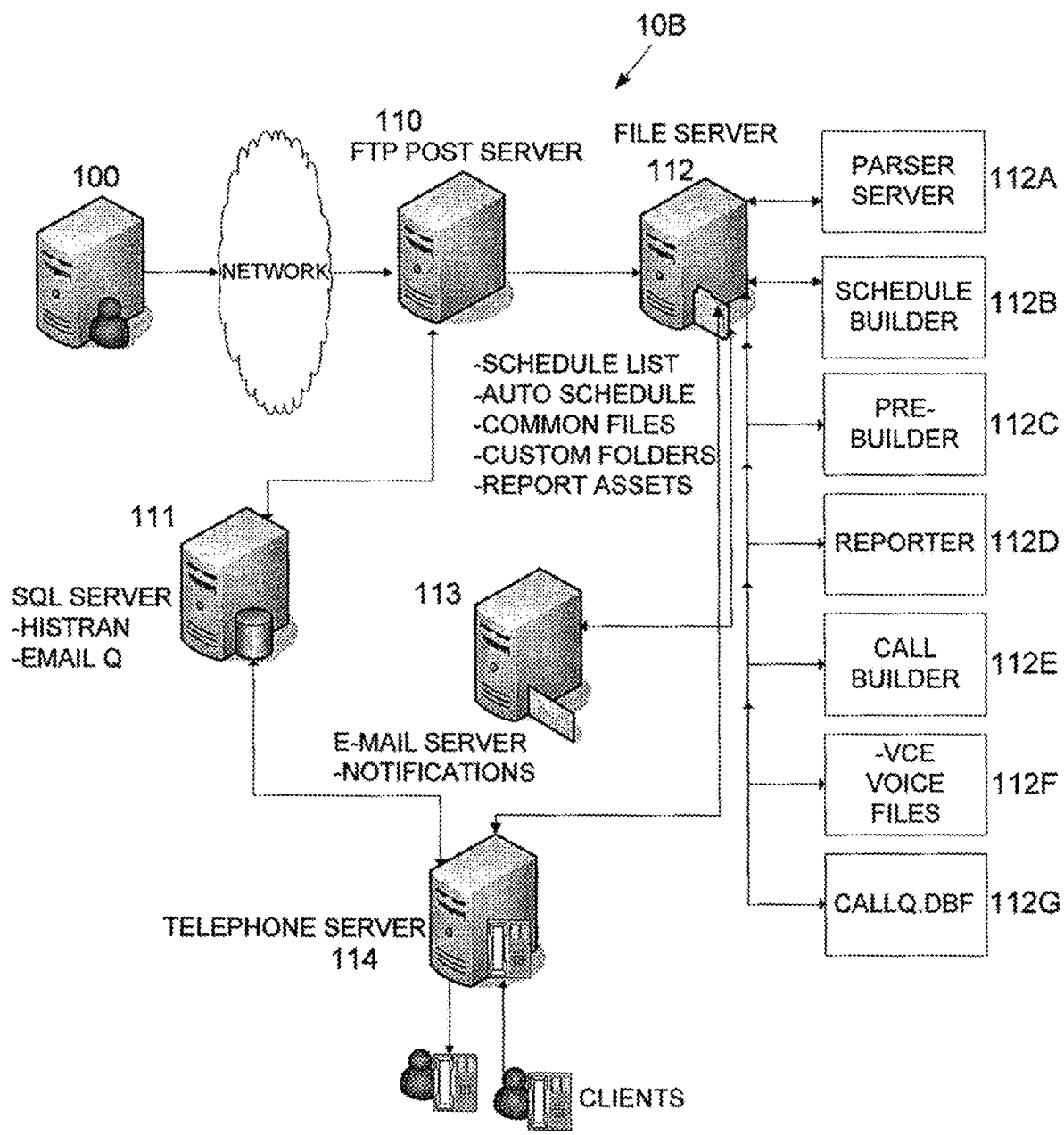
FIG. 2 illustrates an example data record accessing system according to an example embodiment of the present inventive concept.

FIG. 2 illustrates a data record accessing system 10B according to an example embodiment of the present inventive concept. Referring to FIG. 2, client 100 uses a web posting application to connect to a file transfer protocol (FTP) application server 110 over a network illustrated by the network cloud that may represent a wide area network, the Internet, etc. Once a connection is established, the client 100 may send a data file to the FTP post server 110 (which may also include a secure shell (SSH) application).

The data file is originally sent to the FTP post server 110 which provides a connection to a file server 112. After the file has been moved to the file server 112, a record is generated based on the received file, and that record is sent to a database server, such as, for example, a SQL server 113. The SQL server 113 receives the data file and a record may be generated and added to the SQL database in the SQL server 113.

The file server 112 includes multiple server engines, which include a parser server engine 112A, an image parser engine 112B, a pre-builder engine 112C, a reporter engine 112D and a call builder engine 112E. The file server 112 may store VCE voice files and a CallQ.DBF file 112G in its internal memory. Operations performed by file server 112 may include creation and updating of scheduling lists, auto scheduling of client applications and appointments, storing and accessing of common files associated with client information, creating and accessing of custom folders, and reporting of assets to clients.

The file server engines 112A-112E provide additional features for processing the data files which are sent to the file server 112. For example, parser server 112A may read and write the data files to the SQL cluster at the SQL server 113. The parser server 112A may also parse information for the client, such as, appointment data, and then format the appointment data for storage in appointment tables. The schedule builder 112B reviews schedules of clients and builds a record file database file (i.e., CallQ.dbf file 112G).

The pre-builder 112C builds the voice files (VCE files) for the clients' records so that the clients may access their records and listen to the voice files corresponding to their records. The pre-builder 112C also performs a query for the scheduled call information that is setup by the schedule builder 112B. The pre-builder will then create a new file build on the file server 112 for client access and for future updates.

The file server 112 may provide certain applications, such as, automatic scheduling of client appointment times, storing and accessing of common files needed for client resources, creating and updating of custom folders for client resources, etc. The file server 112 may also provide a reporter engine 112E that reports resources to other components of the data accessing system 10B and to the clients. Voice data may be accessed from the VCE voice files 112F and other information may be accessed from the database file CallQ.dbf 112G.

One example operation of the data accessing system 10B is discussed in detail below. Next generation future phone calls are created at the telephone server 117. Each of the telephone server lines will access another database file Schlist.dbf to determine schedule information for clients. The database file Schlist.dbf is also used to associate client information with the future calls and to access the existing file build in the file server 112 and/or create a new file build. Additionally, if data for a future call is not built on an existing file build, then, the call may be built on the file telephone server 117.

The calls may then be made to a corresponding set of pre-established clients informing them of their personal information, schedule information, etc. The telephone server 117 may then initiate the calls to the client telephones or call accessing stations (i.e., mobile stations). Once the calls are dialed out, the calls may be further monitored by the telephone server 117 to track the calls progress. During the calls, the call status may be updated periodically and the call status information may be in the CallQ.dbf file 112G on the file server 112.

The reporter engine 112D will query the schedule lists, discover the schedules that are complete and the corresponding client reports that are ready to be sent to the clients. Other operations of the reporter engine 112D may include inserting the record into the SQL server 113, which may offer a Histran application and an email queue service. The files that are ready to be transferred to clients are placed in an export file in the file server 112. The export files are then sent via FTP, SSH, email, autodial applications, fax or a web posting application to the clients. In one example, the emails may be sent in bulk to the various clients in email notifications sent from the email server 116. The FTP server 110 provides a file transfer protocol application that provides easy access to the clients' records.

Figure 3:
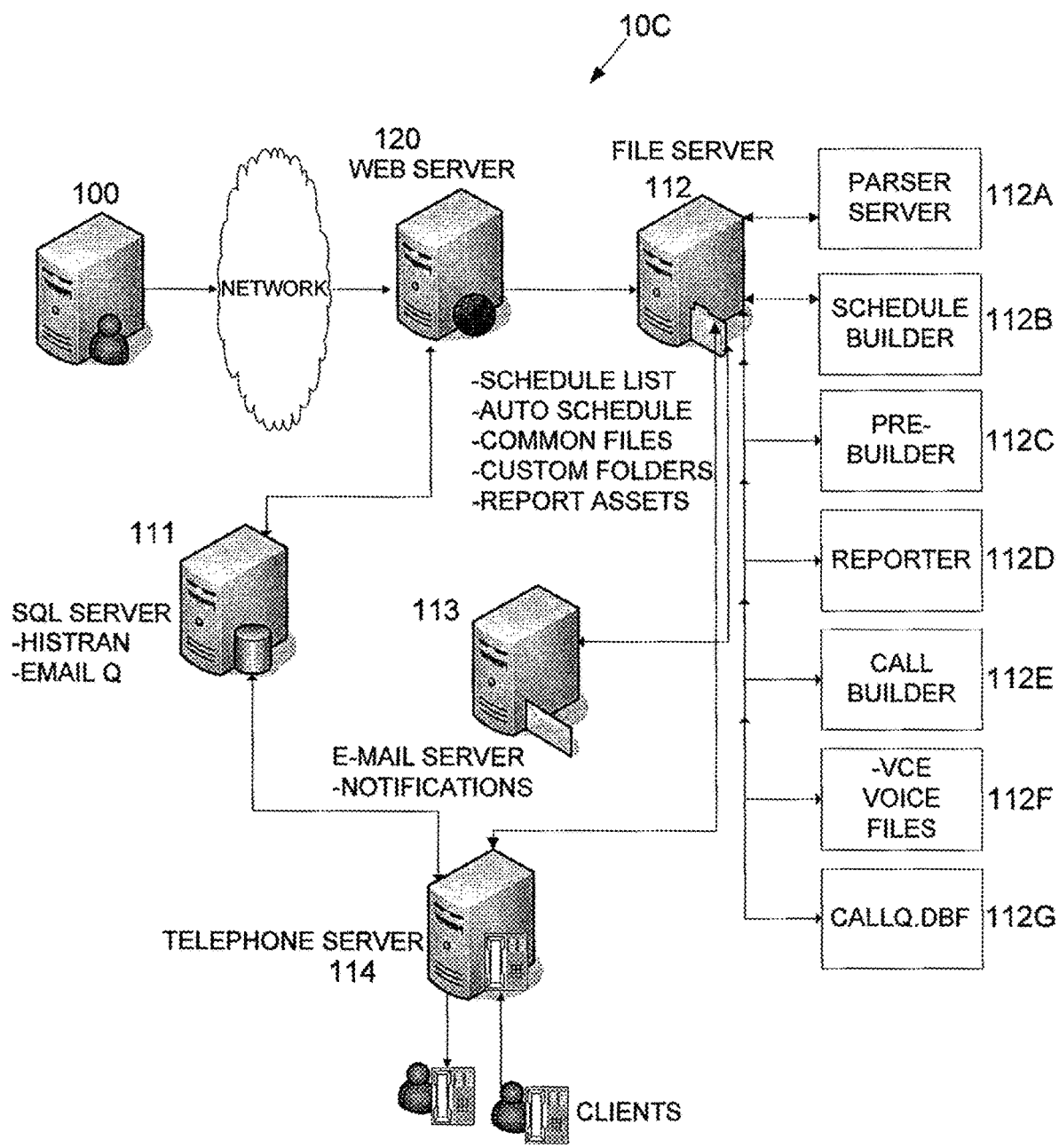
FIG. 3 illustrates another example data record accessing system according to another example embodiment of the present inventive concept.

FIG. 3 illustrates a data record accessing system 10C according to another example embodiment of the present inventive concept. Referring to FIG. 3, client 100 uses a web posting application to connect to web server 120 over a network illustrated by the network cloud that may represent a wide area network, the Internet, etc. Once a connection is established, the client 100 may send a data file to the web server 120.

The data file is originally sent to the web 120 which provides a connection to a file server 112. After the file has been moved to the file server 112, a record is generated based on the received file, and that record is sent to a database server, such as, for example, a SQL server 113. The SQL server 113 receives the data file and a record may be generated and added to the SQL database in the SQL server 113.

The file server 112 includes multiple server engines, which include a parser server engine 112A, an image parser engine 112B, a pre-builder engine 112C, a reporter engine 112D and a call builder engine 112E. The file server 112 may store VCE voice files and a CallQ.DBF file 112G in its internal memory. Operations performed by file server 112 may include creation and updating of scheduling lists, auto scheduling of client applications and appointments, storing and accessing of common files associated with client information, creating and accessing of custom folders, and reporting of assets to clients.

The file server engines 112A-112E provide additional features for processing the data files which are sent to the file server 112. For example, parser server 112A may read and write the data files to the SQL cluster at the SQL server 113. The parser server 112A may also parse information for the client, such as, appointment data, and then format the appointment data for storage in appointment tables. The schedule builder 112B reviews schedules of clients and builds a record file database file (i.e., CallQ.dbf file 112G).

The pre-builder 112C builds the voice files (VCE files) for the clients' records so that the clients may access their records and listen to the voice files corresponding to their records. The pre-builder 112C also performs a query for the scheduled call information that is setup by the schedule builder 112B. The pre-builder will then create a new file build on the file server 112 for client access and for future updates.

In another example, pre-scheduled intervals may be used to perform the various operations of file server 112. For example, the parser server 112A may operate between 12 AM and 3 PM, the schedule builder 112B may operate at mid-day after 3 PM until early evening, and the reporter 112D may finalize and send out reports in the evening so that the clients are reminded of their next-day obligations the evening before their appointments.

The file server 112 may provide certain applications, such as, automatic scheduling of client appointment times, storing and accessing of common files needed for client resources, creating and updating of custom folders for client resources, etc. The file server 112 may also provide a reporter engine 112E that reports resources to other components of the data accessing system 10C and to the clients. Voice data may be accessed from the VCE voice files 112F and other information may be accessed from the database file CallQ.dbf 112G. One or more of these operations may be performed with foxpro and/or other data customization software applications.

One example operation of the data accessing system 10C is discussed in detail below. Next generation future phone calls are created at the telephone server 117. Each of the telephone server lines will access another database file Schlist.dbf to determine schedule information for clients. The database file Schlist.dbf is also used to associate client information with the future calls and to access the existing file build in the file server 112 and/or create a new file build. Additionally, if data for a future call is not built on an existing file build, then, the call may be built on the file telephone server 117.

The calls may then be made to a corresponding set of pre-established clients informing them of their personal information, schedule information, etc. The telephone server 117 may then initiate the calls to the client telephones or call accessing stations (i.e., mobile stations). Once the calls are dialed out, the calls may be further monitored by the telephone server 117 to track the calls progress. During the calls, the call status may be updated periodically and the call status information may be in the CallQ.dbf file 112G on the file server 112.

The reporter engine 112D will query the schedule lists, discover the schedules that are complete and the corresponding client reports that are ready to be sent to the clients. Other operations of the reporter engine 112D may include inserting the record into the SQL server 113, which may offer a Histran application and an email queue service. The files that are ready to be transferred to clients are placed in an export file in the file server 112. The export files are then sent via email, autodial applications, fax or a web posting application to the clients. In one example, the emails may be sent in bulk to the various clients in email notifications sent from the email server 116. The web server 120 provides a web portal application that provides easy access to the clients' records.

Figure 4:
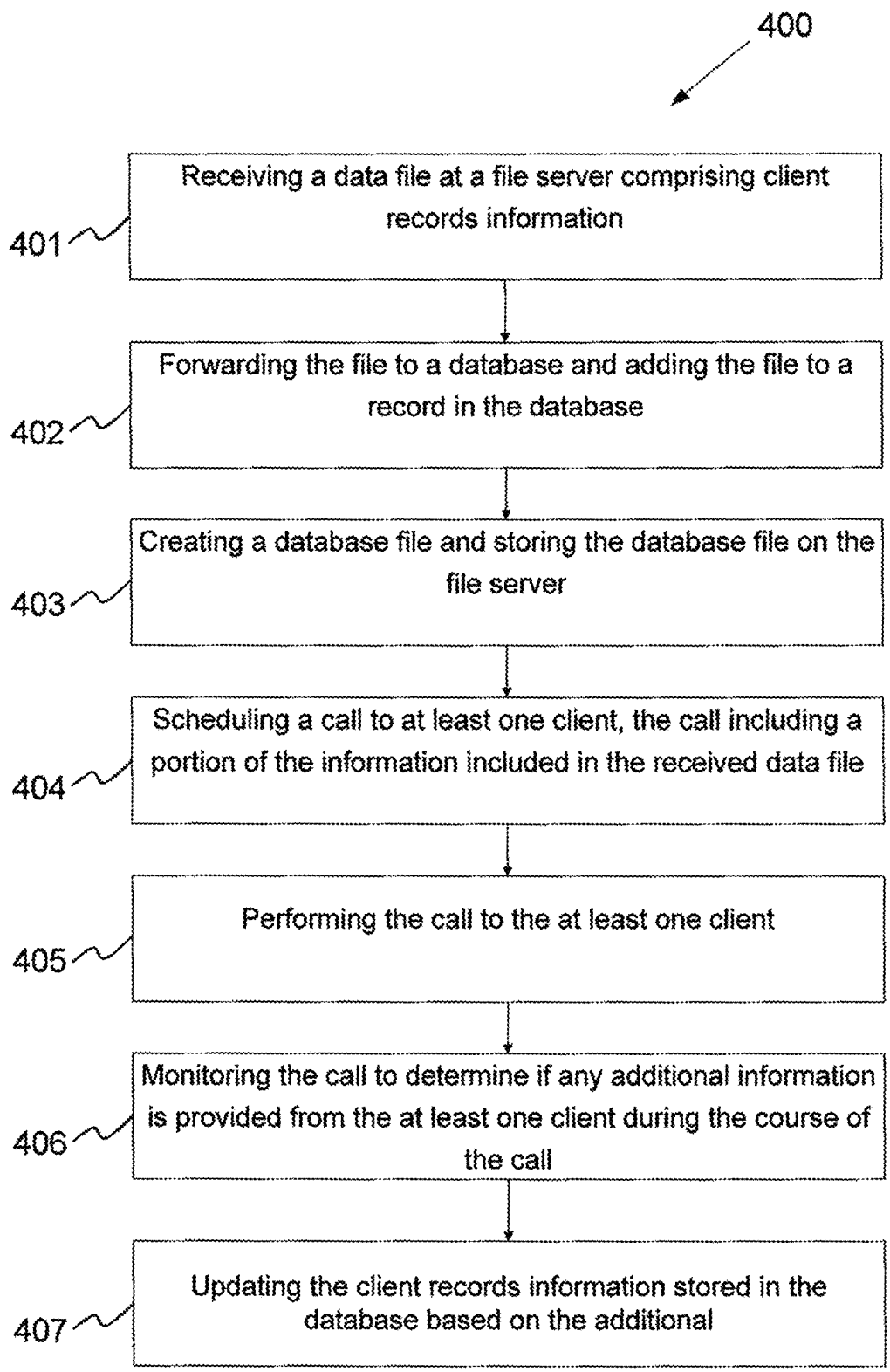
FIG. 4 illustrates a flow diagram according to illustrates an example embodiment of the present inventive concept.

Another example embodiment of the present inventive concept is illustrated in FIG. 4. Referring to FIG. 4, operations of the data file accessing configuration may include receiving a data file at a file server comprising client records information (operation 401). Other operations may include forwarding the file to a database and adding the file to a record in the database, (operation 402), creating a database file and storing the database file on the file server (operation 403), and scheduling a call to at least one client, the call including a portion of the information included in the received data file (operation 404). Further operations may include performing the call to the at least one client (operation 405), monitoring the call to determine if any additional information is provided from the at least one client during the course of the call (operation 406), and updating the client records information stored in the database based on the additional information provided by the at least one client (operation 407).

Examples of file handling procedures of incoming file data will no be described with reference to FIGS. 5 and 6.

Figure 5:
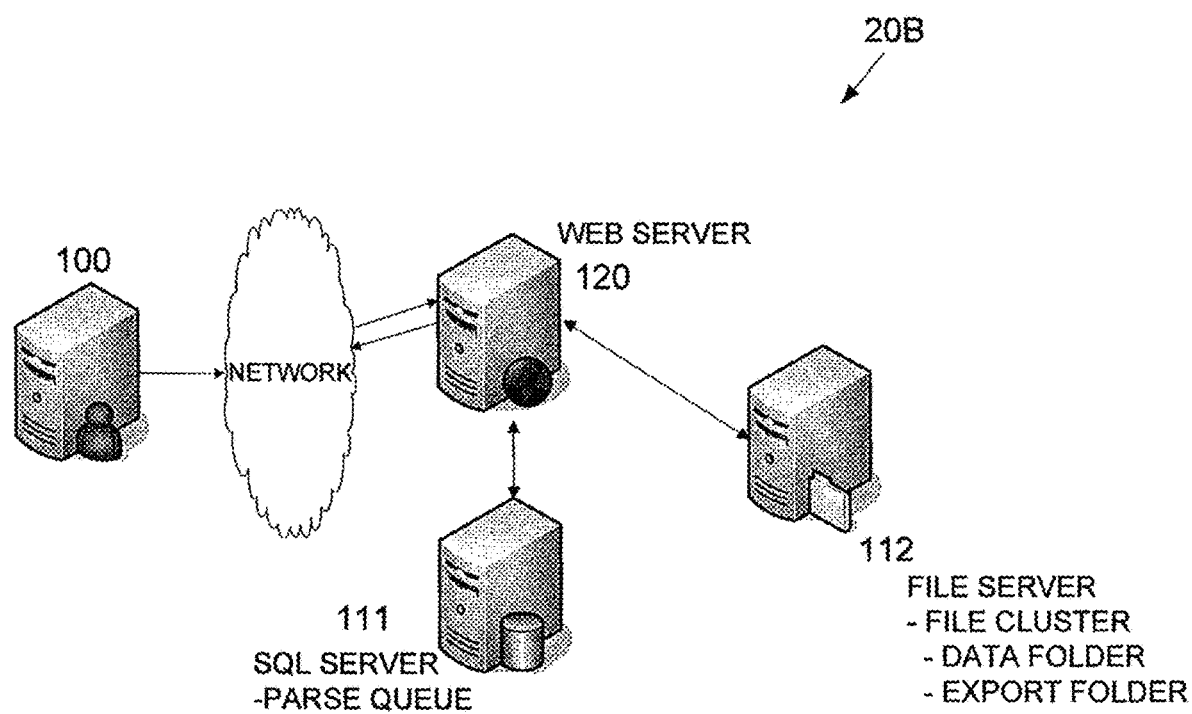
FIG. 5 illustrates a data file handling system according to an example embodiment of the present inventive concept.

FIG. 5 illustrates a data file handling system 20A according to an example embodiment of the present inventive concept. Referring to FIG. 5, a FTP file is received from a client 100 similar to the example described above with reference to FIG. 2. However, in FIG. 5 a local file transfer protocol, secure shell application and/or secure file transfer protocol (FTP/SSH/SFTP) server 130 is also included in the file handling system 20A. The FTP/SSH/SFTP server may also be included in the file handling system of FIG. 2, however, it was omitted from discussion for simplicity of the overall system.

In operation, once the FTP file is received, the file is stored on the FTP/SSH/SFTP server 130 locally for easy future access by other system components and applications. A FTP post application may then be executed to scan the FTP and SSH folders for new files to determine if any new files have been received since the last scan operation. The FTP post application may be stored in the computer readable medium of a separate server (i.e., FTP post server 110) or may be integrated in the computer readable medium of the FTP/SSH/SFTP server 130.

Any new files that are determined to be in the FTP/SSH/SFTP server 130 are copied and sent to a file cluster stored in the file server 112. The file may be indexed and stored in a pre-specified data folder. The FTP post application then performs an update operation to a parse queue table stored in the SQL server 111. The original file may then be deleted from the FTP/SSH/SFTP server 130. The FTP post application may then move a file(s) that has been transferred to an export folder under the file cluster on the file server 112 back to the FTP/SSH/SFTP server 130 for client accessibility.

Figure 6:
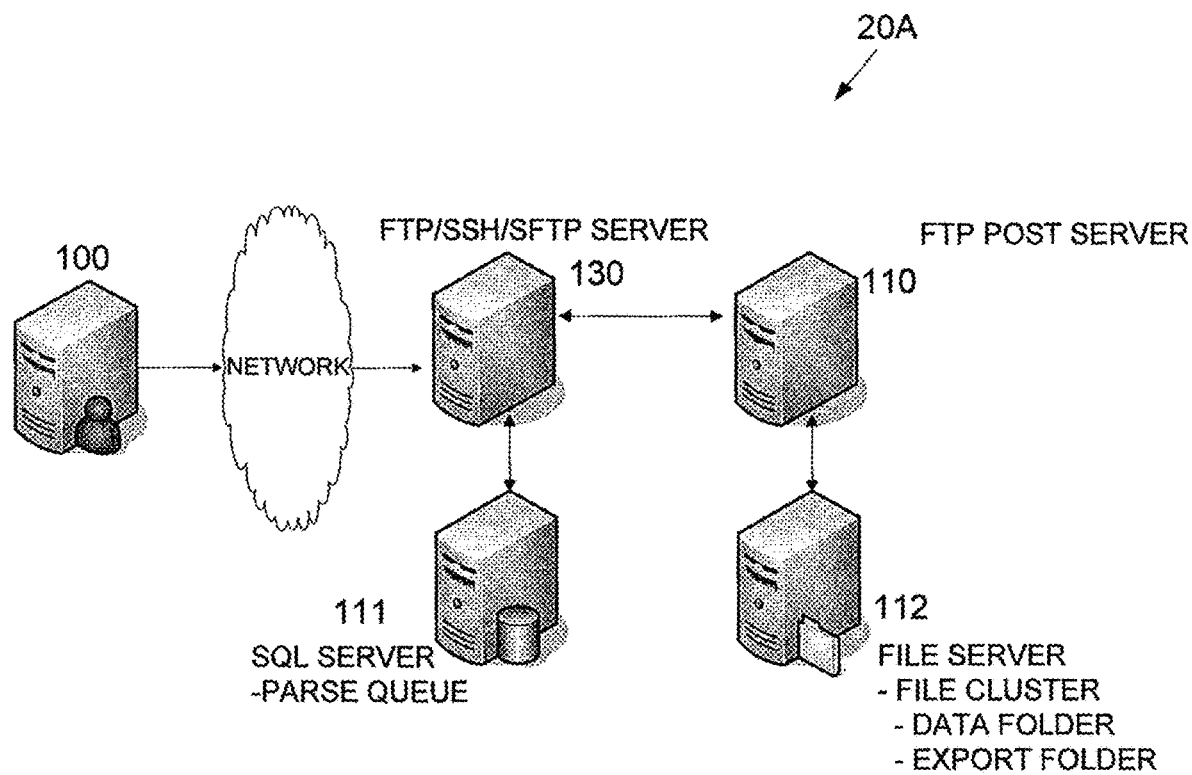
FIG. 6 illustrates another data file handling system according to an example embodiment of the present inventive concept.

FIG. 6 illustrates another data file handling system 20B according to an example embodiment of the present inventive concept. Referring to FIG. 6, the client 100 uses a web posting application to connect to the web server 120 over a network illustrated by the network cloud that may represent a wide area network, the Internet, etc. Once a connection is established, the client 100 may send a FTP file to the web server 120. The client 100 interacts with the web server 120 similar to the example described above with reference to FIG. 3.

Next, the received FTP file is stored in the file server 112. The FTP file may be indexed and stored in a pre-specified data folder of a file cluster of the file server 112. An update operation may then be performed to update the file record in the parse queue table stored in the SQL server 111. The web server 120 may then acknowledge that the file has been received at the file server 120 by sending an acknowledgement message back towards the forwarding device that forwarded the FTP file, and/or back to the client 100.

Figure 7:
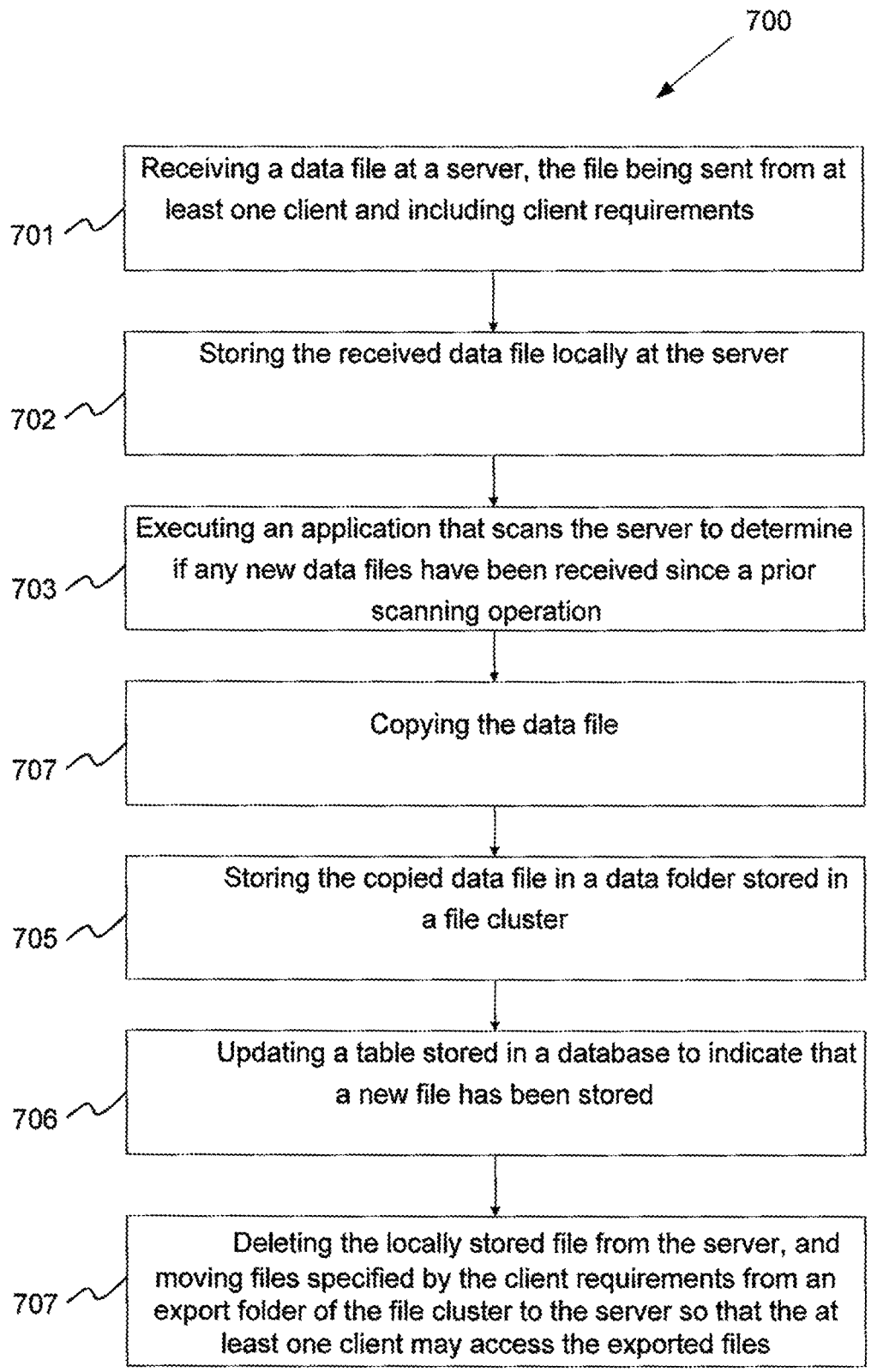
FIG. 7 illustrates a flow diagram according to illustrates an example embodiment of the present inventive concept.

FIG. 7 illustrates an example method 700 according to an example embodiment of the present inventive concept. Operation 701 includes receiving a data file at a server, the file being sent from at least one client and including client requirements. The method also includes operation 702 which includes storing the received data file locally at the server. The method further includes operation 703 which includes executing an application that scans the server to determine if any new data files have been received since a prior scanning operation. The method also includes operation 704 which includes copying the data file. The method also includes operation 705 which includes storing the copied data file in a data folder stored in a file cluster. Further operations include operation 706 which provides updating a table stored in a database to indicate that a new file has been stored. In addition, operation 707 provides deleting the locally stored file from the server, and moving files specified by the client requirements from an export folder of the file cluster to the server so that the at least one client may access the exported files.

The present inventive concept is preferably realized in a hardware device, such as, a computer, cellular phone, or other mobile terminal device etc. In other embodiments, the present invention may be realized in hardware, software, firmware or a combination of hardware, software and/or firmware.

The above example embodiments may also be implemented in software code and may be stored on a computer readable medium, such as, for example, non-volatile memory devices (e.g., RAM, ROM, hard disk etc.). The software code may be accessed from the computer readable medium and may be executed by a processor. The executed program may provide one or more of the features of the example embodiments.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
receiving a data file at a server, the file being sent from at least one client and including client requirements that specify files of a file cluster that are desired to be accessed by the at least one client;
copying the data file;
storing the copied data file in a data folder stored in the file cluster;
deleting the received data file from the server; and
moving files specified by the client requirements from an export folder of the file cluster to the server so that the at least one client may access the exported files.

2. The method of claim 1, wherein the data file is transferred from the at least one client to at least one of an FTP server and a SSH server prior to said data file being stored at the file cluster.

3. The method of claim 1, wherein the data file is transferred from the at least one client to a web server prior to said data file being received at the file cluster.

4. The method of claim 1, comprising updating a table stored in a database to indicate that a new file has been stored, wherein the database is a SQL server database.

5. The method of claim 1, wherein the data file is a FTP file.

6. The method of claim 1, wherein the data file is transferred via at least one of FTP and SSH.

7. A non-transitory computer readable medium storing a software program that when executed controls a processor to perform:
receiving a data file at a server, the file being sent from at least one client and including client requirements that specify files of a file cluster that are desired to be accessed by the at least one client;
copying the data file;
storing the copied data file in a data folder stored in the file cluster;
deleting the received data file from the server; and
moving files specified by the client requirements from an export folder of the file cluster to the server so that the at least one client may access the exported files.

8. The non-transitory computer readable medium of claim 7, wherein the data file is transferred from the at least one client to at least one of an FTP server and a SSH server prior to said data file being stored at the file cluster.

9. The non-transitory computer readable medium of claim 7, wherein the data file is transferred from the at least one client to a web server prior to said data file being received at the file cluster.

10. The non-transitory computer readable medium of claim 7, comprising updating a table stored in a database to indicate that a new file has been stored, wherein the database is a SQL server database.

11. The non-transitory computer readable medium of claim 7, wherein the data file is a FTP file.

12. The non-transitory computer readable medium of claim 7, wherein the data file is transferred via at least one of FTP and SSH.

13. An apparatus, comprising:
   a receiver configured to receive a data file, the file being sent from at least one client and including client requirements that specify files of a file cluster that are desired to be accessed by the at least one client; and
   a processor configured to
      copy the data file,
      store the copied data file in a data folder stored in the file cluster, and
      delete the received data file from the server,
   and locate the files specified by the client requirements from an export folder of the file cluster so that the at least one client may access the exported files.

14. The apparatus of claim 13, wherein the data file is transferred from the at least one client to at least one of an FTP server and a SSH server prior to said data file being received at the server.

15. The apparatus of claim 13, wherein the data file is transferred from the at least one client to a web server prior to said data file being received at the server.

16. The apparatus of claim 13, wherein the data file is transferred via at least one of FTP and SSH.

17. The apparatus of claim 13, wherein an acknowledgement message is sent after the data file has been received.

18. The apparatus of claim 13, wherein the processor is configured to update a table stored in a database to indicate that a new file has been stored.

19. The apparatus of claim 13, wherein the database is a SQL server database.

20. The apparatus of claim 13, wherein the data file is a FTP file.

* * * * *